United States Patent [19]

Kanayama

[11] Patent Number: 4,897,639

[45] Date of Patent: Jan. 30, 1990

[54] IMAGE FORMING METHOD AND APPARATUS

[75] Inventor: Toshikiyo Kanayama, Kanagawa, Japan

[73] Assignee: Fuji Photo Film Co., Ltd., Kanagawa, Japan

[21] Appl. No.: 199,840

[22] Filed: May 2, 1988

[30] Foreign Application Priority Data

Apr. 30, 1987 [JP] Japan .............................. 62-104494

[51] Int. Cl.$^4$ ................................................ G09G 3/00
[52] U.S. Cl. .................................... 340/812; 340/782; 340/752; 340/767; 315/307; 315/169.3; 346/107 R; 346/108
[58] Field of Search ............... 340/812, 811, 767, 793, 340/782, 762, 766, 752, 760, 805; 315/307, 169.2, 169.3; 358/296, 298, 300, 302; 355/229; 346/107 R, 108

[56] References Cited

U.S. PATENT DOCUMENTS

| 4,455,562 | 6/1984 | Dolan et al. .................... 346/107 R |
| 4,592,995 | 6/1986 | Yamakawa et al. ................ 358/302 |
| 4,755,724 | 7/1988 | Wagner .............................. 340/752 |
| 4,780,731 | 10/1988 | Creutzmann et al. .............. 346/108 |

Primary Examiner—Leo H. Boudreau
Assistant Examiner—Jeffery A. Brier
Attorney, Agent, or Firm—Sughrue, Mion, Zinn, Macpeak & Seas

[57] ABSTRACT

Multiple light-emitting diodes in an array are supplied with a constant amount of electric current and the duration of time for which that current is supplied to the individual light-emitting diodes is changed according to the specific level of contrast to be produced. The amount of light received by a light-sensitive material can thus be controlled so that a halftone image is formed. The duration of time for which the electric current is applied to the individual light-emitting diodes consists of a predetermined constant portion and a variable portion to be added thereto. The variable portion is compensated for in accordance with the difference between the relative intensities of light emission from the individual light-emitting diodes when they are supplied with the constant electric current. As a result, the amounts of light emission from the individual light-emitting diodes are rendered sufficiently uniform to effectively compensate for the variation in the intensity of light emission from the individual diodes.

5 Claims, 5 Drawing Sheets

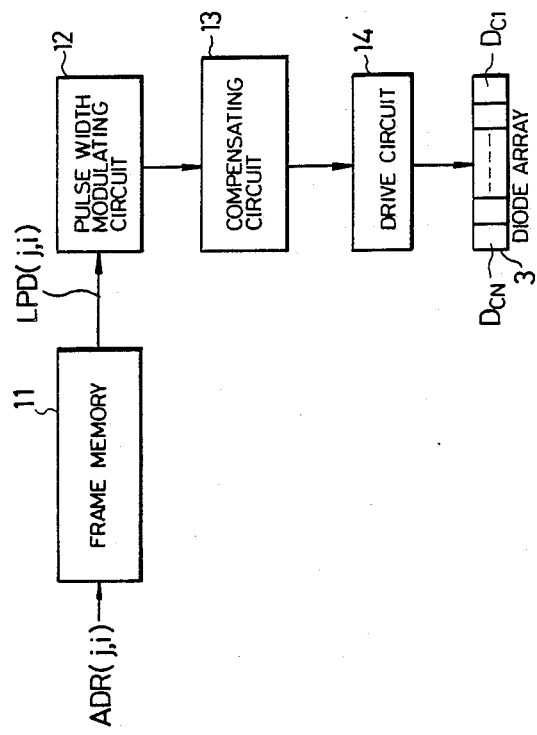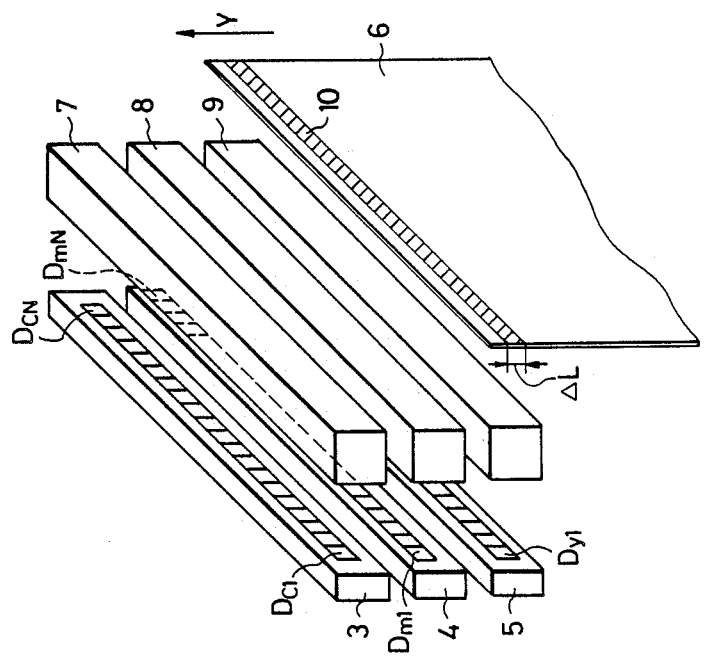

IMAGE FORMING METHOD AND APPARATUS

BACKGROUND OF THE INVENTION

The present invention relates to a method and apparatus for forming an image on a light-sensitive material using an array of light-emitting diodes as point light sources. More particularly, the present invention relates to a method and apparatus for forming a halftone image on a light-sensitive material by controlling the contrast produced by the diode array.

A halftone image (latent image) can be formed on a light-sensitive material, such as a silver salt film, using a light source in the form of an array of tiny light-emitting diodes by controlling the intensity of the emitted light from individual diodes while the film is moved relative to the diode array in a direction perpendicular to the longitudinal direction of the diode array. The intensity of the light emission can be changed by controlling the electric current supplied to the individual light-emitting diodes used as point light sources. Since the light-emitting diodes have different current vs. intensity characteristics, the prior art apparatus for forming halftone images has employed a current supply circuit of the type shown in FIG. 7 or 8.

The circuit shown in FIG. 7 has a light-emitting diode array 1 connected between a power supply $V_{DD}$ and a ground terminal in such a way that a forward bias will be supplied from $V_{DD}$ to the individual LEDs. The cathode of each diode is connected to the ground terminal via a resistor and a transistor, and the intensities of light emission from the individual LEDs are controlled independently of one another by supplying the individual transistors with control signals $S_1-S_n$ having levels corresponding to the contrasts to be produced. The resistivities of the resistors are adjusted in such a way that equal amounts of current will flow into the individual LEDs when control signals $S_1-S_n$ of the same level are applied to the associated transistors. This is effective in providing the LEDs with uniform characteristics.

The circuit shown in FIG. 8 also has a light-emitting diode array 1 connected between a power supply $V_{DD}$ and a ground terminal in such a way that a forward bias will be supplied from $V_{DD}$ to the individual LEDs. However, transistors connected in series to the individual LEDs are connected to the ground terminal via a common resistor 2. This circuit configuration provides substantially uniform characteristics to the LEDs.

The conventional image-forming method employing the compensating means described above has had the following problems. The system shown in FIG. 7 is not suitable for high-resolution image forming, since it is extremely cumbersome to properly adjust the individual resistors when the number of LEDs employed is increased. In addition, the application of laser trimming and other techniques that are commonly used in IC fabrication technology is very difficult to implement in practical situations. The compensating system shown in FIG. 8 is a convenient method for producing high-resolution images, with a plurality of light-emitting diodes being arranged side by side. However, this arrangement is not well suited for providing precision in contrast, since the characteristics of the individual LEDs in the array cannot be rendered completely uniform.

SUMMARY OF THE INVENTION

An object, therefore, of the present invention is to provide a method and apparatus for image forming that satisfactorily solves the problems associated with the variation in the intensity of light emission from LEDs, thereby providing precise control of the contrast produced by individual LEDs.

Generally, this object of the present invention can be attained by an image-forming method and apparatus wherein multiple light-emitting diodes in an array are supplied with a constant amount of electric current and the duration of time for which that current is supplied to the individual light-emitting diodes is changed according to the specific level of contrast to be produced. The amount of light received by a light-sensitive material can thus be controlled so that a halftone image is formed. More specifically, the duration of time for which the electric current is applied to the individual light-emitting diodes consists of a predetermined constant portion and a variable portion to be added thereto. The variable portion is compensated for in accordance with the difference between the relative intensities of light emission from the individual light-emitting diodes when they are supplied from the constant electric current. As a result, the amounts of light emission from the individual light-emitting diodes are rendered sufficiently uniform to effectively compensate for the variation in the intensity of light emission from the individual diodes.

BRIEF DESCRIPTION OF THE DRAWINGS

FIG. 1 is a schematic diagram showing an image forming apparatus in accordance with the present invention;

FIG. 2 is a block diagram showing a control circuit for controlling arrays of light-emitting diodes mounted in the apparatus shown in FIG. 1;

DETAILED DESCRIPTION OF THE INVENTION

Figure 3:
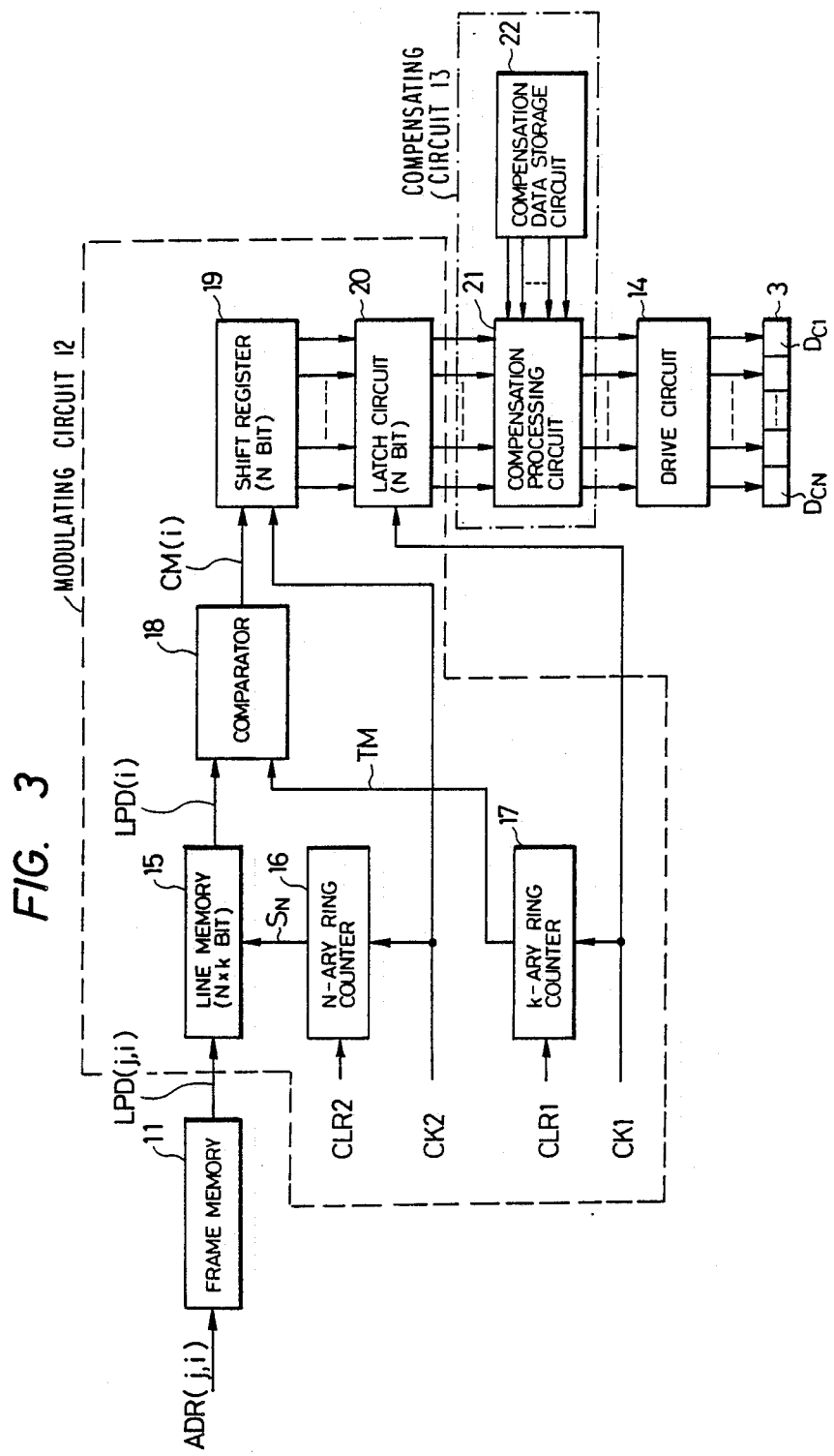
FIG. 3 is a block diagram showing in detail the construction of the pulse width modulating circuit and compensation circuit shown in FIG. 2.

An image forming method and apparatus according to one embodiment of the present invention is described hereinafter with reference to the accompanying drawings.

FIG. 1 shows schematically an apparatus for forming an image using arrays of light-emitting diodes as light sources. The apparatus employs three arrays of light-emitting diodes 3, 4 and 5; the array 3 emits light having a wavelength $\lambda_1$, of about 805 nm to produce cyan, or greenish blue, color on a light-sensitive material; the array 4 emits light having a wavelength $\lambda_2$ of about 665 nm to produce magenta color; and the array 5 emits light having a wavelength $\lambda_3$ of about 570 nm to produce yellow color. The array 3 consists of a group of very tiny light-emitting diodes $D_{c1}-D_{cN}$ arranged side by side in a longitudinal direction; the array 4 consists of a group of very tiny light-emitting diodes $D_{m1}-D_{mN}$; and the array 5 consists of a group of tiny light-emitting diodes $D_{y1}-D_{yN}$. The three diode groups are formed parallel to one another in the longitudinal direction and are spaced at equal pitches in such a way that they face a light-sensitive material 6 such as a silver salt film in the proper way.

Selfoc lenses 7, 8 and 9 are interposed between the light-sensitive material 6 and the diode arrays 3, 4 and 5, respectively. When the light-sensitive material 6 is moved in the direction indicated by arrow Y, the light issuing from each of the arrays 3, 4 and 5 will illuminate a single line on the light-sensitive material 6 through an associated Selfoc lens 7, 8 or 9. Taking a lineal area 10 (shown as the hatched portion in FIG. 1) as an example, the light from the array 5 will first illuminate a part of the moving light-sensitive material 6 over a width ΔL; then the light from the array 4 illuminates the same part over the same width ΔL; and the light from the array 3 finally illuminates the same area by the same width ΔL. As a result of this illumination of light having three different wavelengths $\lambda_1$, $\lambda_2$ and $\lambda_3$, a portion of a color image will form in the area 10. As the light-sensitive material 6 is further moved and illumination repeated in the manner described above, more portions of a color image are formed until an image of one frame (a latent color image) is produced.

Light emission from the diode groups $D_{c1}$–$D_{cN}$, $D_{m1}$–$D_{mN}$ and $D_{y1}$–$D_{yN}$ is controlled with the control circuit shown in FIG. 2. A control circuit for the diode array 3 is shown specifically in FIG. 2, but the same circuit may be employed to control the other arrays 4 and 5, so the following explanation should be taken as being also applicable to these arrays.

The composition of the control circuit will first be described. A frame memory 11 stores contrast data for each of the pixels in one image frame. If an image of one frame is to be formed on the light-sensitive material 6 by illumination of M lines with N light-emitting diodes $D_{c1}$–$D_{cN}$, M sets of contrast data are stored with each set including N pieces of contrast data associated with respective diodes $D_{c1}$–$D_{cN}$. Each piece of contrast data is composed of k bits of binary data and hence is capable of expressing $2^k$ levels of contrast. The symbol j in FIG. 2 is an integer between 1 and M and denotes a line number, and the symbol i which is an integer between 1 and N and denotes a diode number. Contrast data LPD (j,i) stored in the frame memory 11 read out in response to an address signal ADR (j,i).

A pulse width modulating circuit 12 generates a rectangular signal having a duration of time proportional to the value of contrast data LPD (j,i).

A compensating circuit 13 compensates for the duration of time of a signal from the circuit 12 on the basis of compensation data. Details of the composition and operation of this compensation circuit 13 will be given below and it suffices here to say that the compensation effected by this circuit introduces uniformity in the quantity of light emission for each level of contrast to be produced from the individual light-emitting diodes.

A drive circuit 14 drives light-emitting diodes $D_{c1}$–$D_{cN}$. This circuit 14 supplies a constant amount of electric current to each of the diodes $D_{c1}$–$D_{cN}$ to activate its light emission. At the same time, this circuit 14 sets the period of light emission from the individual diodes $D_{c1}$–$D_{cN}$ in accordance with the duration of time determined by the rectangular signal generated from the circuit 12. Therefore, the quantity of light to be emitted from each diode is determined solely by the length of this duration of time.

FIG. 3 is a block diagram showing in detail the pulse width modulating circuit 12 and the compensating circuit 13. The portion of FIG. 3 which corresponds to the pulse width modulating circuit 12 is composed of a line memory 15, an N-ary ring counter 16, a k-ary ring counter 17, a comparator 18, a shift register 19 and a latch circuit 20. The portion of FIG. 3 which corresponds to the compensating circuit 13 is composed of a compensation processing circuit 21 and a compensation data storage circuit 22.

The line memory 15 has a storage region of k bits at each of its N storage addresses and is capable of storing contrast data for one line from the frame memory 11.

Figure 5:
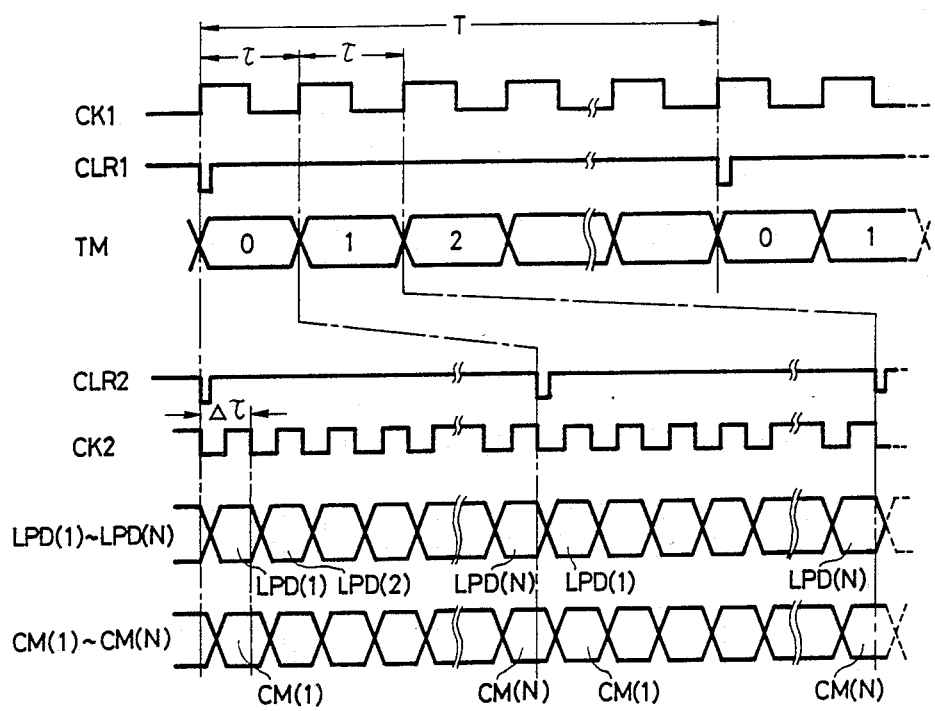
FIGS. 5 and 6 are timing charts for illustrating the operation of the apparatus shown in FIG. 1.

The N-ary ring counter 16 counts from 1 to N in response to a clock signal CK2 of a predetermined period Δτ as shown in FIG. 5. This ring counter supplies the resulting count data $S_N$ as an address signal to the line memory 15, thereby allowing the latter to supply the comparator 18 with contrast data LPD (i) stored at a designated address i. When all the pieces of contrast data LPD (1) to LPD (N) are read from the line memory 15, the ring counter 16 is reset in response to a CLEAR signal CLR2 and repeats the same counting operation. In this way, contrast data LPD (1) to LPD (N) are cyclically outputted to the comparator 18 in association with the light-emitting diodes $D_{c1}$–$D_{cN}$.

The K-ary ring counter 17 are provided to set $2^k$ levels of contrast. As shown in FIG. 5, this ring counter counts the number of clock signals CK1 having a predetermined period τ and supplies the resulting count data TM to one of the two input terminals of comparator 18 for comparison with contrast data LPD (i) supplied from the line memory 15.

The clock signal CK2 has a period Δτ which is one-Nth of the period τ of clock signal CK1, where N is the number of light-emitting diodes $D_{c1}$–$D_{cN}$.

The comparator 18 compares the value of count data TM with that of contrast data LPD (i). If LPD (i)≧TM, the comparator 18 generates logical data CM (i) expressed by a single bit of "1". If LPD (i)<TM, the comparator 18 generates logical data CM (i) expressed by a single bit of "0".

The shift register 19 has storage capacity for N bits and stores sequentially logical data CM(1) to CM(N) that are supplied in synchronism with clock signal CK2.

The latch circuit 20 has a storage capacity of N bits for latching logical data CM(1) to CM(N) from shift register 19 in synchronism with clock signal CK1 (when CK1 makes a transition from a low level "L" to a high level "H" level in FIG. 5).

The operation of the pulse width modulating circuit 12 will now be described more specifically with reference to the timing chart shown in FIG. 5. The K-ary ring counter 17 counts up by "1" within a period τ, during which period the N-ary ring counter 16 counts from 1 to N. Therefore, each time the count data TM counts up by "1" (within each period τ), it is compared with all pieces of contrast data LPD (1) to LPD (N) supplied from the line memory 15, and N-bit logical data CM(1) to CM(N) resulting from the comparisons and corresponding to light-emitting diodes $D_{c1}$–$D_{cN}$ are stored first in the shift register 19. The logical data in register 19 is then stored in the latch circuit 20 in synchronism with the clock signal CK1. This sequence is repeated in response to each count-up of count data TM (in each period τ), so that sets of logical data CM(i) corresponding to the number of times the count data TM are counted up until a predetermined maximum value equal to the number of contrast levels $2^k$ is reached, and are then stored in synchronism with the clock signal CK1.

In other words, the pulse width modulating circuit 12 composed of line memory 15, N-ary ring counter 16, k-ary ring counter 17, comparator 18, shift register 19 and latch circuit 20 serves to convert contrast data to pulse-width modulated data and is so designed that within the period required for the count data TM to reach a predetermined maximum value, it drives light-emitting diodes $D_{c1}$–$D_{cN}$ on the basis of the logical data CM(i) held in $D_{c1}$–$D_{cN}$, in order to emit light in accordance with contrast data LPD(1)–LPD(N).

As shown in FIG. 5, ring counters 17 and 16 are reset when CLEAR signals CLR1 and CLR2, respectively, make a transition from "H" to "L" level. The period $\tau$ of generation of CLEAR signal CLR2 serves as the period of pulse width modulation for one line. In FIG. 5, the timing of each of the signals CLR2 and CK2 and the data LDP(i) and CM(i) is shown enlarged with respect to the period $\tau$.

The compensation processing circuit 21 processes the logical data CM(i) in the latch circuit 20 on the basis of compensation data H(1)–H(N) stored in the compensation data storage circuit 22. By this processing described in more detail below, the circuit 21 compensates for any variation in the intensity of light emission from individual light-emitting diodes $D_{c1}$–$D_{cN}$.

The drive circuit 14 causes light emission from the diodes $D_{c1}$–$D_{cN}$ on the basis of the logical data CM(i) compensated in the compensation processing circuit 21. If logical data CM(i) of certain bits is "1", the drive circuit 14 supplies a constant current to a corresponding diode $D_{ci}$ to activate its light emission. If this logical data is "0", the drive circuit will supply no current.

The compensation processing circuit 21 is hereunder described in detail with reference to FIG. 4.

Figure 4:
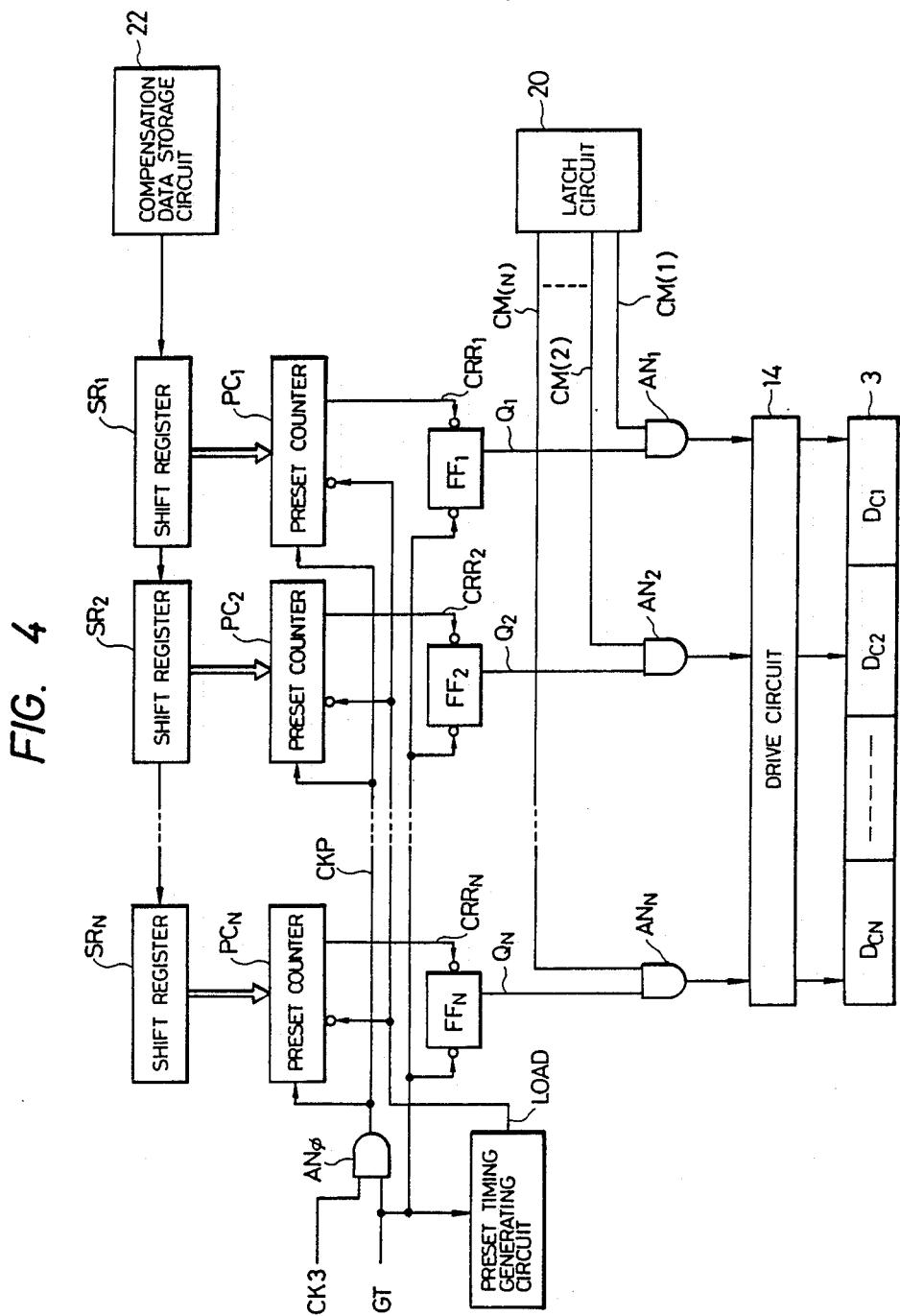
FIG. 4 is a block diagram showing in detail the construction of the compensation processing circuit shown in FIG. 3.

In FIG. 4, $SR_1$ and $SR_2$–$SR_N$ are k-bit shift registers which hold compensation data H(1)–H(N) that are supplied from the compensation data storage circuit 22 in association with respective light-emitting diodes $D_{c1}$–$D_{cN}$.

Presettable counters $PC_1$–$PC_N$ are preset with the compensation data held in the shift registers $SR_1$–$SR_N$.

R/S flip-flop circuits $FF_1$–$FF_N$ are reset upon receiving carry signals $CRR_1$–$CRR_N$ produced from the overflow terminals of counters $PC_1$–$PC_N$, and they are set in response to a gate signal GT.

An AND circuit $AN_{100}$ calculates the logical sum of a clock signal CK3 and the gate signal GT and supplies the resulting counter clock signal CKP as a clock signal to the counters $PC_1$–$PC_N$. AND circuits $AN_1$–$AN_N$ calculate the logical sums of logical data CM(1)–CM(N) from the latch circuit 20 and output signals $Q_1$–$Q_N$ from the R/S flip-flop circuits $FF_1$–$FF_N$. The resulting new logical data CM(1)–CM(N) are supplied to the drive circuit 14.

Figure 6:
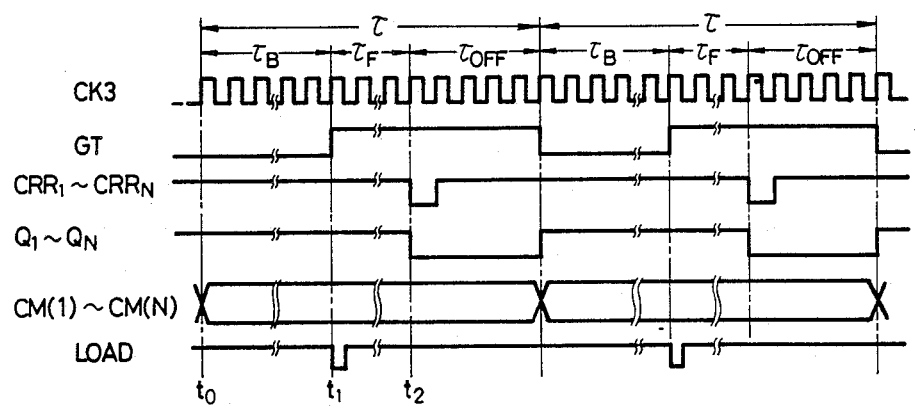
Figure 7:
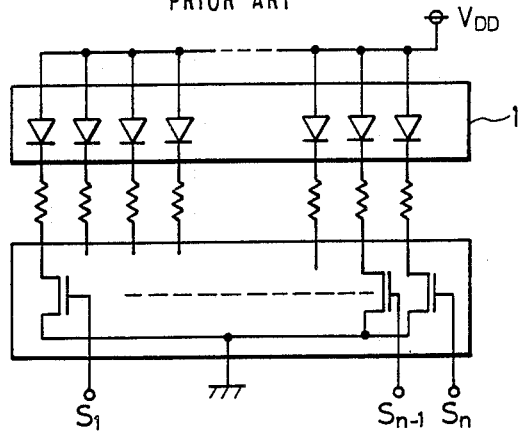
FIGS. 7 and 8 are circuit diagrams showing contrast control techniques employed in the prior art method of forming image with an array of light-emitting diodes.
Figure 8:
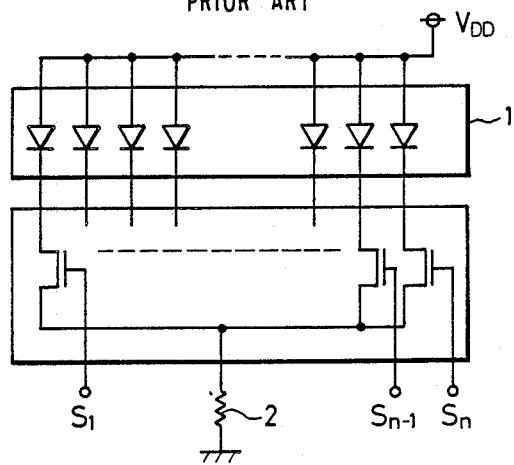

The operation of the compensation processing circuit 21 is described hereinafter with reference to FIG. 6 for a period of $2\tau$. The level of the gate signal GT remains low for a period $\tau_B$ which is part of the period $\tau$ and then turns high and remains so in the rest of the period $(\tau - \tau_B)$. This timing is set uniformly for all light-emitting diodes $D_{c1}$–$D_{cN}$. The frequency of the clock signal CK3 is set to a suitably high level depending upon the intended precision of compensation. The higher the frequency of clock signal CK3, the more precise the compensation that can be achieved.

Transfer of compensation data H(1)–H(N) to the shift registers $SR_1$–$SR_N$ has been completed before image formation is started, for example, when power is turned on. In synchronism with the time when new logical data CM(1)–CM(N) is held in the latch circuit 20, the compensation data H(1)–H(N) from the shift registers $SR_1$–$SR_N$ are cyclically preset in the preset counters $PC_1$–$PC_N$ at time $t_1$ (see FIG. 6) in response to a LOAD signal.

During the reference period $\tau_B$ from time $t_0$ to 1, the counter clock signal CKP remains at a low level, and the preset counters $PC_1$–$PC_N$ will perform no counting operation. At the same time, the flip-flop circuits $FF_1$–$FF_N$ are brought to a set state in response to gate signal GT, producing high level output signals $Q_1$–$Q_N$. As a consequence, the logical data CM(1)–CM(N) held in the latch circuit 20 are supplied straight-forwardly onto the drive circuit 14 through AND circuits $AN_1$–$AN_N$, and the diodes $D_{c1}$–$D_{cN}$ are controlled to emit light in varying quantities in accordance with the supplied logical data.

At time $t_1$, which is the end point of period $\tau_B$, the level of the gata signal GT becomes high and the preset counters $PC_1$–$PC_N$ start to count up. At time $t_2$ when the counters overflow, the carry signals $CRR_1$–$CRR_N$ make a transition from "H" to "L" level, causing the flip-flop circuits $FF_1$–$FF_N$ to reset. This causes a transition to a low level in the output signals $Q_1$–$Q_N$ from the flip-flop circuits $FF_1$–$FF_N$ at time $t_2$, so that the light-emitting diodes $D_{c1}$–$D_{cN}$ are controlled to be turned off during the rest of the period, or $\tau_{OFF} (= \tau - (\tau_B + \tau_F))$. In FIG. 6, carry signals $CRR_1$–$CRR_N$ are shown collectively but in practice the time to overflow, or $\tau_F$, varies with the value of compensation data H(1)–H(N), so that these carry signals are adjusted independently of one another for the respective light-emitting diodes $D_{c1}$–$D_{cN}$. In other words, a preset counter that is preset with compensation data of a greater value will overflow earlier than a preset counter that is preset with a lesser value, and the duration of the addition period $\tau_F$ is correspondingly shortened. Conversely, the duration of addition period $\tau_F$ is increased as the value of compensation data becomes smaller.

In accordance with the present invention, the relationship described above is used as a basis for presetting the necessary compensation data in the following manner. First, the same amount of current is supplied to the individual light-emitting diodes $D_{c1}$–$D_{cN}$ and the intensity of lght emitted from each diode is measured. Then, as for diodes that produce weak light, the value of compensation data is decreased so as to increase the length of time of light emission $\tau_B + \tau_F$. By making such compensation, the quantity of light emitted from the individual diodes $D_{c1}$–$D_{cN}$ during the period $\tau$ can be rendered uniform. If this control for the period $\tau$ is repeated $2^k$ times, namely, for all levels of contrast to be attained, control of compensation for contrast for one line is completed.

According to the embodiment of the present invention described above, cumbersome adjustments such as the resistivity adjustment involved in the prior art are eliminated and an inter-diode variations in the intensity of light emission can be easily compensated on the basis of compensation data. This offers a particularly great benefit in the case where a great number of light-emitting diodes are employed, and hence renders the method of the present invention suitable for the formation of a high-resolution image.

To summarize the advantage of the present invention, it adds a variable time to a predetermined reference time and adjust the duration of the variable time in accordance with the variation in the intensities of light emitted from individual light-emitting diodes; so the inter-diode variation in light intensity can be effectively eliminated to produce uniform light emission for each of the contrast levels to be attained, thereby enabling contrast control be accomplished in an easy and precise manner.

What is claimed is:

1. An image-forming apparatus comprising:
    a plurality of arrays of light-emitting diodes, each of said arrays of light-emitting diodes being arranged in a first direction, said arrays being parallel to one another and facing a light sensitive material;
    a plurality of lenses, one lens for each of said arrays, interposed between one of said arrays and said light sensitive material;
    frame memory means for storing contrast data for each of said light emitting diodes in said arrays;
    pulse width modulating means receiving said contrast data from said frame memory means and generating pulse signals with durations proportional to said contrast data;
    compensating means receiving said pulse signals and adjusting the duration of said pulse signals in accordance with compensating data; and
    drive means for supplying current to each of said light emitting diodes of said arrays in accordance with the output of said compensating means.

2. An image-forming apparatuses claimed in claim 1, wherein said pulse width modulating means comprises:
    line memory means for storing a line of contrast data from said frame memory;
    first counter means for counting a first clock signal and for supplying an address to said line memory means;
    second counter means for counting second clock signal and providing second counter outputs representing different contrast values;
    comparator means for comparing the output of said line memory means with the output of said second counter means;
    shift register means for storing outputs produced by said comparator means; and
    latch means responsive to said second clock signal for latching the contents of said shift register means.

3. An image-forming apparatus as claimed in claim 2, wherein said compensating means comprises:
    compensating data storage means for storing said compensating data; and
    compensation processing means for processing the logical data in said latch means based on the compensating data stored in said compensating data storage means.

4. An image-forming apparatus as claimed in claim 3, wherein said compensation processing means comprises:
    a plurality of shift registers for receiving said compensating data corresponding to respective ones of said diodes;
    a plurality of counting means presettable in accordance with the compensating data held in respective ones of said shift registers;
    a plurality of flip-flop circuits each of which is reset by the output of one of said plurality of presettable counting means, and all of which are set by receiving a gate signal; and
    a plurality of AND circuit means for combining the outputs of said latch means and the outputs of said plurality of flip-flop circuits, to obtain said output of said compensating means.

5. An image-forming apparatus as claimed in claim 4, further comprising:
    a further AND circuit means for combining a third clock signal and said gate signal and supplying an output to an input of said counting means.

* * * * *